(12) United States Patent
Harris et al.

(10) Patent No.: US 11,046,038 B2
(45) Date of Patent: Jun. 29, 2021

(54) METHOD AND KIT FOR REPAIRING LEAKS IN GAS-FILLED INFLATABLE OBJECT

(71) Applicants: James Albert Harris, St. Thomas, VI (US); James Edwin Harris, Canton, MI (US)

(72) Inventors: James Albert Harris, St. Thomas, VI (US); James Edwin Harris, Canton, MI (US)

(*) Notice: Subject to any disclaimer, the term of this patent is extended or adjusted under 35 U.S.C. 154(b) by 0 days.

(21) Appl. No.: 16/195,382

(22) Filed: Nov. 19, 2018

(65) Prior Publication Data

US 2020/0156334 A1    May 21, 2020

(51) Int. Cl.
   *B29C 73/08*    (2006.01)
   *B29L 22/02*    (2006.01)
   *B29C 65/48*    (2006.01)
   *B29C 73/12*    (2006.01)
   (Continued)

(52) U.S. Cl.
   CPC .............. *B29C 73/08* (2013.01); *B29C 65/48* (2013.01); *B29C 66/861* (2013.01); *B29C 73/12* (2013.01); *B29L 2022/02* (2013.01); *B32B 37/0046* (2013.01)

(58) Field of Classification Search
   CPC .. B29L 2030/00; B29L 2022/02; B29C 73/00; B29C 73/04; B29C 73/06; B29C 73/063; B29C 73/066; B29C 73/08; B29C 73/10; B29C 73/105; B29C 73/12; B29C 65/00; B29C 65/48; B29C 65/4825; B29C 65/56; B29C 65/78; B29C 66/00; B29C 66/80; B29C 66/861; B29C 73/02; Y10T 152/10882; Y10T 152/10891; Y10T 152/10909; Y10T 428/20; B60C 25/16; B32B 37/0046
   USPC ......... 156/60, 94, 95, 97, 98, 145, 146, 147, 156/156, 250, 267, 293, 303.1, 349, 378, 156/391, 423, 510, 538, 539, 556, 579;
   (Continued)

(56) References Cited

U.S. PATENT DOCUMENTS

| 2,866,494 A | 12/1958 | Sanderson |
| 3,175,432 A * | 3/1965 | Crandall ................. B29C 73/08 81/15.7 |
| 3,400,445 A | 9/1968 | Crandall et al. |

(Continued)

FOREIGN PATENT DOCUMENTS

CN    2236939    10/1996

*Primary Examiner* — Philip C Tucker
*Assistant Examiner* — Brian R Slawski
(74) *Attorney, Agent, or Firm* — Brooks Kushman P.C.

(57) ABSTRACT

Several aspects of this disclosure relate to a reusable kit and it method of use for repairing a leak in a gas-filled inflatable object. In one form, the kit may include: a hollow housing with a leading end region and a trailing end region; a plunger with a front end region and a back end region, the front end region having a tubular nose, the front end region being adapted to be received in the leading end region of the hollow housing; a plug having a head portion and a shaft portion extending therefrom, the shaft portion of the plug being adapted to be mounted at least partially in a tubular nose of the front end region of the plunger; a sealing ring that surrounds the plunger proximate the front end region thereof, the sealing ring serving to interface with an inner wall of the hollow housing; and an adhesive provided below an underside of the head portion of the plug.

8 Claims, 2 Drawing Sheets

(51) Int. Cl.
*B29C 65/00* (2006.01)
*B32B 37/00* (2006.01)

(58) Field of Classification Search
USPC .......... 81/15.2, 15.7, 44, 487; 152/367, 370; 428/63
See application file for complete search history.

(56) References Cited

U.S. PATENT DOCUMENTS

| | | | |
|---|---|---|---|
| 3,425,476 A | 2/1969 | Legg | |
| 4,951,531 A * | 8/1990 | Nishio | B29C 73/08 |
| | | | 81/15.7 |
| 4,973,450 A * | 11/1990 | Schluter | G01N 1/4077 |
| | | | 422/535 |
| 2015/0196715 A1* | 7/2015 | Lanier | A61M 5/1458 |
| | | | 604/154 |

* cited by examiner

US 11,046,038 B2

METHOD AND KIT FOR REPAIRING LEAKS IN GAS-FILLED INFLATABLE OBJECT

BACKGROUND OF THE INVENTION

(1) Field of the Invention

Several aspects of this disclosure relate to a kit and method of making repairs to an inflatable gas-filled object, such as a maritime vessel.

(2) Description of Related Art

A deflated or partially inflated vessel such as but not limited to a dinghy may be able to be repaired by a plug. Ideally, such kits and methods should be inexpensive and the method steps should be simple to execute.

Traditionally, a first step is to locate the site that needs repair. After examining the vessel wall to locate a puncture, one may discover a nail or screw, or some other sharp object embedded therein. Traditionally, the spot may be marked to facilitate the identification of its location. Often, the nail or screw may then be removed. But a disadvantage of this step is that a partially filled vessel may ultimately become more or less completely deflated. This may complicate the repair task, particularly if some internal pressure is needed to secure a plug for example, to the inside of the vessel wall.

Among the art considered before preparing this patent application are the following references: U.S. Pat. Nos. 2,866,494; 3,400,445; 3,425,476 and CN2236939Y.

BRIEF SUMMARY OF THE INVENTION

Several aspects of this disclosure relate to a reusable kit for repairing a leak in a gas filled inflatable vessel. In one form, the kit may include:

a. a hollow housing with a leading end region and a trailing end region;

b. a plunger with a front end region and a back end region, the front end region having a tubular nose, the front end region being adapted to be received in the leading end region of the hollow housing;

c. a plug having a head portion and a shaft portion extending therefrom, the shaft portion of the plug being adapted to be mounted at least partially in a tubular nose of the front end region of the plunger;

d. a sealing ring that surrounds the plunger proximate the front end region thereof, the sealing ring serving to interface with an inner wall of the hollow housing; and e. an adhesive provided below an underside of the head portion of the plug.

To practice the disclosure, these are some exemplary steps:

a. inserting the leading end region of the hollow housing into a wall of the inflatable vessel at the site to be repaired, the vessel being at least partially inflated;

b. moving the plunger into a poised position within the hollow housing so that the head portion of the plug is juxtaposed with an inside surface of the leading end region of the hollow housing;

c. advancing the plunger and the plug in relation to the hollow housing toward a repair position in which the plug passes through the wall of the vessel and the adhesive on the underside of the plug is brought into contact with an inside surface of the vessel wall around a site to be repaired; and d. removing the hollow housing and the plunger from the site, thereby leaving the plug to be urged by pressure in the vessel into engagement with the inside wall of the vessel and thereby sealing the leak.

DETAILED DESCRIPTION OF THE INVENTION

Figure 1:
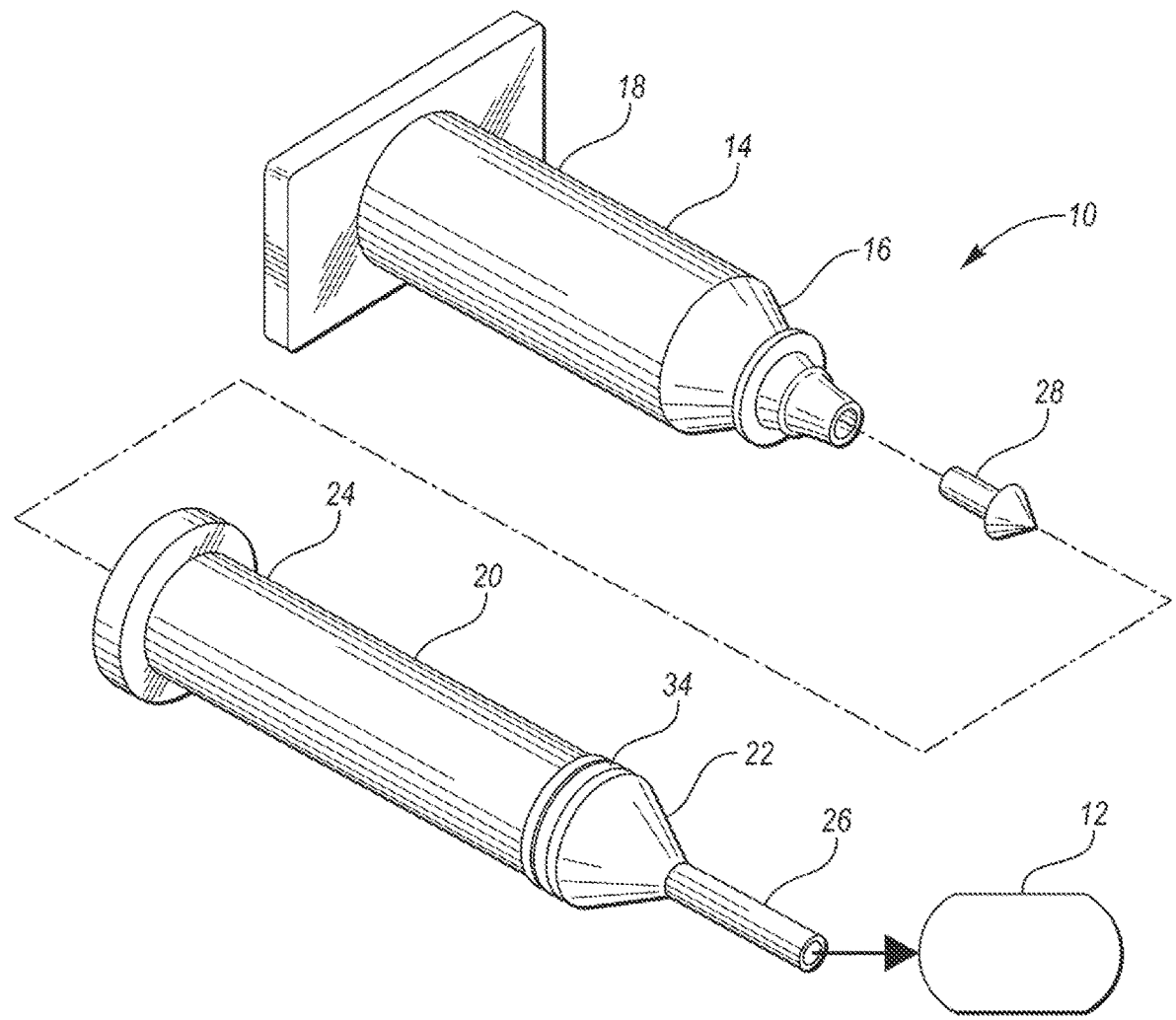
FIG. 1 is a is an exploded view of several kit components.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Many aspects of this disclosure involve a reusable kit 10 for repairing a leak in a gas-filled inflatable vessel 12. Preferably, the vessel 12 may be any suitable form of a rubberized, synthetic fabric (e.g. a life vest, a dinghy, a cushion, an air mattress, an inner tube, a life raft, a basketball, a football (collectively "vessel")).

As one variant, the kit 10 includes a hollow housing 14 with a leading end region 16 and a trailing end region 18. Insertable within the hollow housing 14 is a plunger 20 with a front end region 22 and a back end region 24. Often, the plunger 20 is made of nylon. Preferably, the front end region 22 of the plunger 20 has a tubular nose 26 and is adapted to be received in the leading end region 16 of the hollow housing 14.

Figure 2:
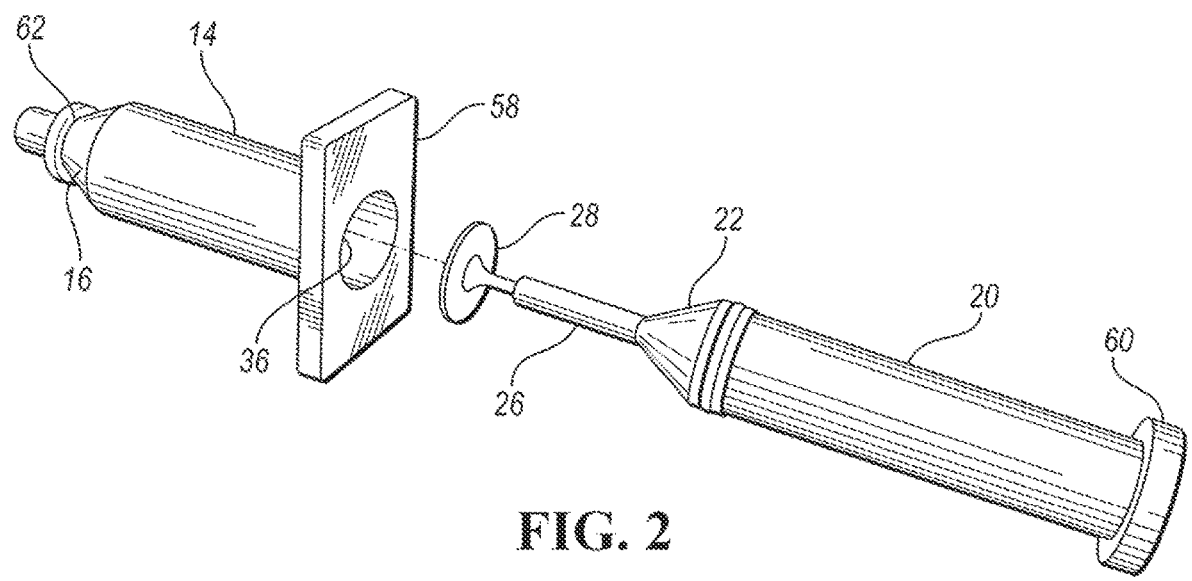
FIG. 2 is a quartering perspective view of several components before they are moved into touching engagement.

Turning first to FIGS. 1-2, a plug 28 is provided with a head portion 30 and a sacrificial shaft portion 32 extending therefrom. The plug 28 may be made for example of neoprene (e.g. a silicone flapper valve, a check valve for a dinghy, an elastomer, and an umbrella seal). The shaft portion 32 of the plug 28 is adapted to be mounted at least partially in a tubular nose 26 of the front end region 22 of the plunger 20. Typically, the plug 28 is expandable, and remains in-situ after repair.

Surrounding the plunger 20 is a sealing ring 34 (one or more) proximate its the front end region 22. The sealing ring 34 serves to interface with an inner wall 36 of the hollow housing 14.

A room temperature adhesive 38 (e.g. 3M's 4800) provided below an underside 40 of the head portion 30 of the plug 28.

Figure 3:
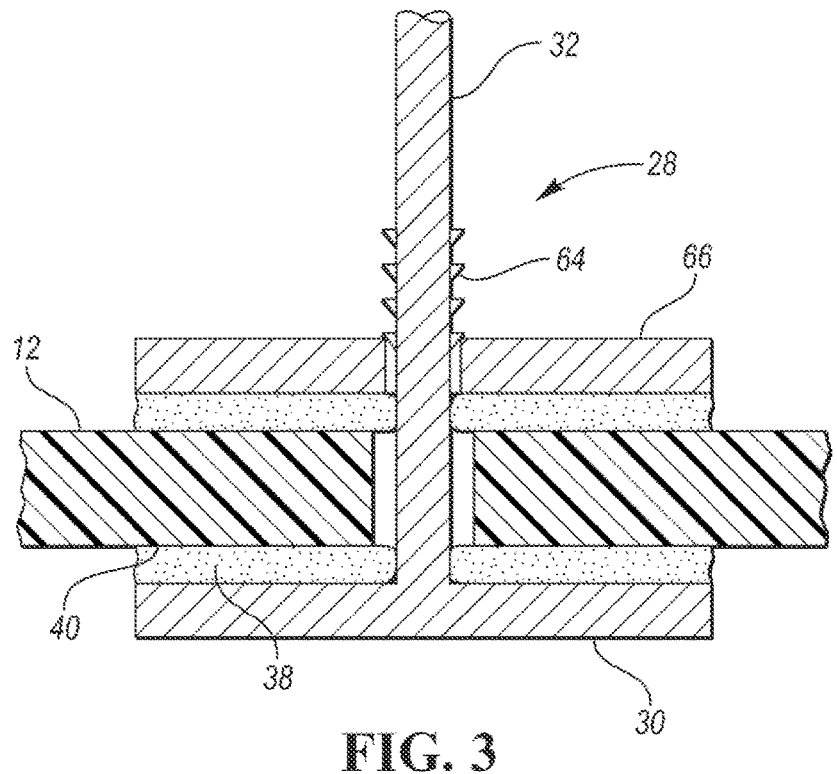
FIG. 3 is a sectional view of a plug having been inserted into a vessel wall.

To practice use of such a kit 10, method steps are followed. As one example, these steps are suggested, not necessarily in this sequence:

i. inserting the leading end region 16 of the hollow housing 14 into a wall 36 of the inflatable vessel 12 that is at least partially inflated;

ii. positioning the plunger 20 into a poised position 42 within the hollow housing 14 so that the head portion 30 of the plug 28 is juxtaposed with an inside surface of the leading end region 16 of the hollow housing 14;

iii. advancing the plunger 20 and the plug 28 in relation to the hollow housing 14 toward a repair position (FIG. 3) in which the plug 28 passes through the vessel wall 12 of the vessel 12 and the adhesive 38 on the underside 40 of the plug 28 is brought into contact with an inside surface of the vessel wall 12 around a site to be repaired; and iv. removing the hollow housing 14 and the plunger 20 from the repair site, thereby leaving the plug 28 to be urged by pressure in the vessel 12 into engagement with the inside wall of the vessel 12 and thereby sealing the leak.

In one variant, the method may include the step of:

v. cutting at least some of the shaft portion 32 of the plug 28 that extends outside the wall of the vessel 12.

Optionally, one method of use includes these further steps:

vi. adhesive 38 on the underside 40 of the plug 28 is brought into contact with the inside of the vessel wall 12 around a site to be repaired and the adhesive 38 on the underside 40 of the head portion 30 of the plug 28 is brought into contact with an inside surface 48 of the vessel wall 12; and vii. removing the hollow housing 14 and the plunger 20 from the site, thereby leaving the head portion 30 of the plug 28 to be urged by pressure in the vessel 12 into engagement with the inside wall of the vessel 12. An adherent relationship is then formed between the head portion 30 of the plug 28 and the vessel wall 12, thereby sealing the leak.

Reverting to exemplary embodiments of the kit 10, an annular washer 66 may surround the shaft portion 32 of the plug 28. In another embodiment, the shaft portion 32 of the plug 28 is provided with a ratchet mechanism 64 that engages the annular washer 66. The ratchet mechanism surrounds the shaft portion 32 of the plug 28 so that the annular washer 66 may be lowered into abutting relationship with adhesive 38 and the vessel wall 12.

In further structural detail, the leading end region 16 of the hollow housing 14 is frusto-conical and the front end region 22 of the plunger 20 is frustoconical. A mating relationship therebetween may therefore be enabled.

Preferably, the trailing end region 18 of the hollow housing 14 is provided with a gripping flange 58 and the back end region 24 of the plunger 20 is provided with a pushing lobe 60.

In an alternate embodiment, the leading end region 16 of the hollow housing 14 is provided with an annular collar 62 that serves as a depth gauge upon inserting the hollow housing 14 into the vessel wall 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCE NUMBERS

| | |
|---|---|
| 10 | Reusable kit |
| 12 | Gas-filled inflatable vessel |
| 14 | Housing |
| 16 | Leading end region |
| 18 | Trailing end region |
| 20 | Plunger |
| 22 | Front end region |
| 24 | Back end region |
| 26 | Tubular nose |
| 28 | Plug |
| 30 | Head portion |
| 32 | Shaft portion |
| 34 | Sealing ring |
| 36 | Inner wall of plunger 20 |
| 38 | Adhesive |
| 40 | Underside of plug 28 |
| 42 | Poised position |
| 44 | Inside surface |
| 46 | Repair position |
| 48 | Inside surface of vessel wall 12 |
| 50 | Shoulder portion |
| 52 | Top side |
| 54 | Inside surface of housing 14 |
| 56 | Top surface |
| 58 | Gripping flange |
| 60 | Pushing lobe |
| 62 | Annular collar |
| 64 | Ratchet mechanism |
| 66 | Annular washer |

What is claimed is:

1. A reusable kit for repairing a leak in a gas-filled inflatable vessel, the kit including
    a hollow housing with a leading end region having a smooth outside surface to facilitate insertion into the leak and a trailing end region;
    a plunger with a front end region and a back end region, the front end region having a tubular nose, the front end region being adapted to be received in the leading end region of the hollow housing;
    a plug having a head portion and a shaft portion extending therefrom, the shaft portion of the plug being adapted to be mounted at least partially in the tubular nose of the front end region of the plunger;
    a sealing ring that surrounds the plunger proximate the front end region thereof, the sealing ring serving to interface with an inner wall of the hollow housing;
    an adhesive provided below an underside of the head portion of the plug, wherein the shaft portion of the plug is provided with a ratchet mechanism that engages an annular washer, and
    wherein the ratchet mechanism surrounds the shaft portion of the plug so that the annular washer may be lowered into abutting relationship with the adhesive and a wall of the gas-filled inflatable vessel.

2. The reusable kit of claim 1, wherein the head portion of the plug extends radially outwardly from the shaft portion.

3. The reusable kit of claim 1, wherein the leading end region of the hollow housing is frustoconical.

4. The reusable kit of claim 1, wherein the front end region of the plunger is frustoconical.

5. The reusable kit of claim 1, wherein the trailing end region of the hollow housing is provided with a gripping flange.

6. The reusable kit of claim 1, wherein the back end region of the plunger is provided with a pushing lobe.

7. The reusable kit of claim 1, wherein the leading end region of the hollow housing is provided with an annular collar that serves as a depth gauge upon inserting the hollow housing into the wall of the gas-filled inflatable vessel.

8. A reusable kit for repairing a leak in a gas-filled inflatable vessel, the kit including
- a hollow housing with a leading end region and a trailing end region;
- a plunger with a front end region and a back end region, the front end region having a tubular nose, the front end region being adapted to be received in the leading end region of the hollow housing;
- a plug having a head portion and a shaft portion extending therefrom, the shaft portion of the plug being adapted to be mounted at least partially in the tubular nose of the front end region of the plunger;
- a sealing ring that surrounds the plunger proximate the front end region thereof, the sealing ring serving to interface with an inner wall of the hollow housing;
- an adhesive provided below an underside of the head portion of the plug, wherein the head portion of the plug extends radially outwardly from the shaft portion,
- wherein the shaft portion of the plug is provided with a ratchet mechanism that engages an annular washer, and
- wherein the ratchet mechanism surrounds the shaft portion of the plug so that the annular washer may be lowered into abutting relationship with the adhesive and a wall of the gas-filled inflatable vessel.

\* \* \* \* \*